(12) United States Patent
Alexander et al.

(10) Patent No.: US 6,405,957 B1
(45) Date of Patent: Jun. 18, 2002

(54) DATA STORAGE TAPE CARTRIDGE AND TAPE PATH WITH AN IDLER WRAP GUIDE FOR REDUCED LATERAL TAPE MOVEMENT

(75) Inventors: Jerry L. Alexander, St. Paul Park; Daniel C. Egan, Oakdale; Douglas W. Johnson, Stillwater; Christopher J. Zwettler, Maplewood, all of MN (US); William J. Vanderheyden, Loveland, CO (US); Albert E. Bass, Jr., Oxnard, CA (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/504,195

(22) Filed: Feb. 15, 2000

(51) Int. Cl.⁷ .............................................. G03B 23/07
(52) U.S. Cl. ...................... 242/346; 360/132
(58) Field of Search .............................. 242/346, 346.1, 242/346.2, 345, 345.1, 597.6, 599.2, 599.4, 343, 343.1, 343.2, 358; 360/132, 96.3, 130.21; 226/97, 196

(56) References Cited

U.S. PATENT DOCUMENTS

| | | | |
|---|---|---|---|
| 3,334,835 A | * | 8/1967 | Kaneko |
| 3,641,283 A | * | 2/1972 | Brooke |
| 3,831,882 A | | 8/1974 | Fitterer et al. |
| 3,836,096 A | | 9/1974 | Fukushima et al. |
| 4,104,686 A | | 8/1978 | Hashimoto |
| 4,262,860 A | * | 4/1981 | Hurtig et al. |
| 4,466,582 A | | 8/1984 | Shiba |
| 4,697,759 A | | 10/1987 | Henderson et al. |
| 5,202,809 A | | 4/1993 | Dodt et al. |
| 5,282,105 A | * | 1/1994 | Eaton et al. ........... 360/130.21 |
| 5,289,331 A | * | 2/1994 | Eaton et al. ........... 360/130.21 |
| 5,348,243 A | | 9/1994 | Ohmachi et al. |
| 5,358,193 A | * | 10/1994 | Madsen et al. ......... 342/346 X |
| 5,377,927 A | * | 1/1995 | Erickson et al. ............ 242/346 |
| 5,513,815 A | | 5/1996 | Erickson et al. |
| 5,543,992 A | * | 8/1996 | Hu et al. .................... 360/132 |
| 5,558,291 A | | 9/1996 | Anderson et al. |
| 5,657,937 A | | 8/1997 | Todd et al. |
| 5,703,741 A | * | 12/1997 | Wrobel et al. .............. 360/132 |
| 5,706,146 A | | 1/1998 | Ono et al. |
| 5,716,018 A | * | 2/1998 | Begley et al. .............. 242/346 |
| 5,754,378 A | * | 5/1998 | Ishikawa et al. ........... 360/132 |
| 5,957,361 A | * | 9/1999 | Kobayashi et al. .. 242/346.2 X |
| 6,078,481 A | * | 6/2000 | Vanderheyden et al. .... 360/132 |
| 6,125,096 A | * | 9/2000 | Jacobs et al. .......... 360/132 X |
| 6,205,001 B1 | * | 3/2001 | Vanderheyden et al. .... 360/132 |

FOREIGN PATENT DOCUMENTS

| | | |
|---|---|---|
| GB | 2 126 561 | 3/1984 |
| JP | 7-73645 | 3/1995 |

\* cited by examiner

Primary Examiner—William A. Rivera
(74) Attorney, Agent, or Firm—Eric D. Levinson (57) ABSTRACT

A data storage tape cartridge including a housing, first and second tape reels, a storage tape, first and second corner guides and an idler wrap guide. The housing defines a head access window. The tape reels are rotatably disposed within the housing, with the storage tape extending between the tape reels. The first and second corner guides are disposed within the housing at opposite sides of the head access window. Finally, the idler wrap guide is disposed within the housing and defines a tape path extending from the first tape reel to the idler wrap guide, and from the idler wrap guide to the first corner guide. The idler wrap guide is configured to frictionally dampen lateral movement of the storage tape upon rotation of the tape reels to greatly reduce servo off track events.

37 Claims, 5 Drawing Sheets

DATA STORAGE TAPE CARTRIDGE AND TAPE PATH WITH AN IDLER WRAP GUIDE FOR REDUCED LATERAL TAPE MOVEMENT

BACKGROUND OF THE INVENTION

The present invention relates to a data storage tape cartridge and associated tape path. More particularly, it relates to a data storage tape cartridge or tape path incorporating at least one idler wrap guide for limiting lateral storage tape movement during use.

Data storage tape cartridges have been used for decades in the computer, audio and video fields. Due to low costs and high storage capacities, data storage tape cartridges continue to be an extremely popular form of recording large volumes of information for subsequent retrieval and use.

One type of data storage tape cartridge consists generally of an outer shell or housing maintaining two tape reels, two or more corner guides, and a length of magnetic storage tape. The storage tape is wrapped about and extends between the two tape reels. The corner guides, in turn, articulate the storage tape through a defined tape path. In this regard, the tape path, as defined by the various corner guides, typically extends across a head access window (or read/write zone) formed in the housing. In particular, corner guides are positioned at opposite sides of the head access window to direct the tape path through the head access window. These two corner guides are typically "compliant guides," each providing an arcuate guide surface and opposing tape edge (or lateral) stop surfaces, one of which is compliant. Any remaining corner guides or guide surfaces are positioned to direct the storage tape between the tape reels and the corner guides associated with the head access window. Regardless, a door is normally associated with the head access window to provide selective access to the storage tape. During use, the data storage tape cartridge is inserted into a tape drive. The door is maneuvered into an open position and a transducer, such as a magnetic read/write head, engages the storage tape via the head access window. To ensure consistent, accurate engagement by the read/write head, the storage tape must be precisely positioned within the head access window.

Alternatively, single reel data storage tape cartridges are available and are well known in the art. Basically, upon engagement with the tape drive, the storage tape is directly away from the cartridge housing by internal components of the tape drive. For example, the storage tape may include a leader block that is configured to be engaged by the tape drive for directing the storage tape into engagement with the read/write head. With this design, the tape drive itself will include various internal guides for defining the desired tape path.

The data storage tape cartridges described above are normally operated (i.e., the tape reel(s) engaged and rotated to "drive" the storage tape along the read/write head) in at least three different operational modes, including a start-up acceleration mode, a data transfer mode and a search mode. The effective tape speed varies for each mode. During the start-up acceleration mode, the storage tape is initially driven at a relatively low tape speed and accelerated. During the data transfer mode, a "steady state" tape speed is normally realized as data is read from or recorded to the storage tape. The data transfer mode tape speed is faster than that of the start-up acceleration mode. Finally, the search mode is employed to rapidly find data at a certain location along the tape length. As such, the search mode is typically performed at a much higher tape speed than that of the data transfer mode.

Regardless of the exact tape speed, various inherent design issues may compromise desired, precise positioning of the storage tape across the read/write head. For example, the tape reel(s) may contribute to unexpected lateral (or edge-to-edge) tape movement. In this regard, the typical tape reel includes a central hub and opposing flanges. The storage tape is wrapped about the central hub and is laterally constrained by the flanges (i.e., the flanges limit lateral movement of the storage tape by contacting a respective top or bottom edge). However, so as to not overly wear the storage tape edges, a slight tape edge-to-flange spacing is presented. That is to say, an overall lateral spacing between the opposing flanges is greater than a height of the storage tape, typically on the order of 0.002–0.01 inch. As a result, during tape reel rotation, the storage tape may move laterally from flange-to-flange. This is especially true during the data transfer mode in which the outermost layers of storage tape are normally not tightly wrapped about the tape reel hub. In other words, a "slack" is developed in the storage tape, such that the storage tape easily moves laterally between the opposing flanges. This unforeseen lateral movement is "seen" by the head, leading to read/write errors.

The corner guides cannot readily correct this unexpected lateral movement in that the guide surfaces associated with the comer guides are configured so as to not frictionally engage the storage tape at relatively high tape speeds, such as those encountered in the data transfer mode. Effectively, at tape speeds in the data transfer mode, an air barrier is generated between the guide surface and the storage tape such that the storage tape "flies" over the guide surface. Thus, the guide surface does not frictionally dampen lateral tape movement. As previously described, compliant tape guides typically incorporate opposing, transverse surfaces that present "hard stops" to lateral tape movement. These transverse surfaces effectively angularly redirect lateral movements in the storage tape. In other words, a storage tape that has moved laterally along a tape reel will deflect at the associated compliant guide transverse surface, rendering the storage tape skewed or off-center with respect to the head.

Any slight deviation (or skew) from a desired planar positioning of the storage tape within the head access window may result in reading/writing errors. If the storage tape is slightly above or below an expected location, the read/write head will experience difficulties in finding a desired track on the storage tape. Additionally, the read/write head may encounter tracking problems whereby the head "loses" a desired track. Importantly, with recent improvements in storage tape media that have increased available track densities, the likelihood of lateral movement-caused errors has similarly increased.

Data storage tape cartridges are important tools used to maintain vast amounts of information. While the evolution of cartridge components, including the storage tape and compliant guides, have greatly improved data storage tape cartridge capacity and performance, other unexpected problems, including lateral tape movement, have been identified. Therefore, a need exists for a data storage tape cartridge and tape path configured to dampen lateral storage tape movement during use, particularly in a data transfer mode.

SUMMARY OF THE INVENTION

One aspect of the present invention relates to a data storage tape cartridge comprising a housing, first and second tape reels, a storage tape, first and second comer guides and an idler wrap guide. The housing defines a head access window. The first and second tape reels are rotatably disposed within the housing, with the storage tape extending between the first and second tape reels. The first and second corner guides are disposed within the housing at opposite sides of the head access window for guiding the storage tape across the head access window. Finally, the idler wrap guide is disposed within the housing and defines a tape path extending from the first tape reel to the idler wrap guide, and from the idler wrap pin to the first corner guide. With this in mind, the idler wrap guide is configured to frictionally dampen lateral movement of the storage tape upon rotation of the tape reels. By dampening lateral storage tape movement, servo off track events are greatly reduced. In one preferred embodiment, the idler wrap guide is a pin forming a compound radius (or diameter) of curvature.

Another aspect of the present invention relates to a data storage tape cartridge comprising a housing, first and second tape reels, a storage tape, first and second corner guides and an idler wrap guide. The housing defines a head access window. The first and second tape reels are rotatably disposed within the housing, with the storage tape extending between the tape reels along a tape path. The first and second corner guides are positioned within the housing to direct the tape path across the head access window. Finally, the idler wrap guide is disposed within the housing along the tape path between the first tape reel and the first corner guide. In this regard, the idler wrap guide is positioned to engage the storage tape at a wrap angle of at least 30°. With this configuration, the idler wrap guide frictionally dampens lateral movement of the storage tape upon rotation of the tape reels.

Yet another aspect of the present invention relates to a method of using a data storage tape cartridge and tape drive. The method includes engaging the data storage tape cartridge within the tape drive. To this end, the data storage tape cartridge includes a housing, at least one tape reel rotatably disposed within the housing and a storage tape wound about and extending from the tape reel. The tape drive includes a read/write head. The storage tape is articulated through a tape path such that the storage tape engages the read/write head. The tape path is defined in part by an idler wrap guide. The storage tape is driven along the read/write head. In this regard, the storage tape is driven at different tape speeds for a start-up acceleration mode, a data transfers mode and a search mode. With this in mind, the idler wrap guide frictionally dampens lateral movement of the storage tape during at least the data transfer mode. The method is applicable to both single reel and dual reel data storage tape cartridges.

Yet another aspect of the present invention relates to a tape path for a storage tape of a tape cartridge engaged by a tape drive that includes a read/write head. During use, the storage tape is driven transversely along the read/write head. With this in mind, the tape path is defined in part by an idler wrap guide. The idler wrap guide is configured to frictionally dampen lateral movement of the storage tape as the storage tape is driven along the read/write head.

DETAILED DESCRIPTION OF THE PREFERRED EMBODIMENTS

Figure 1:
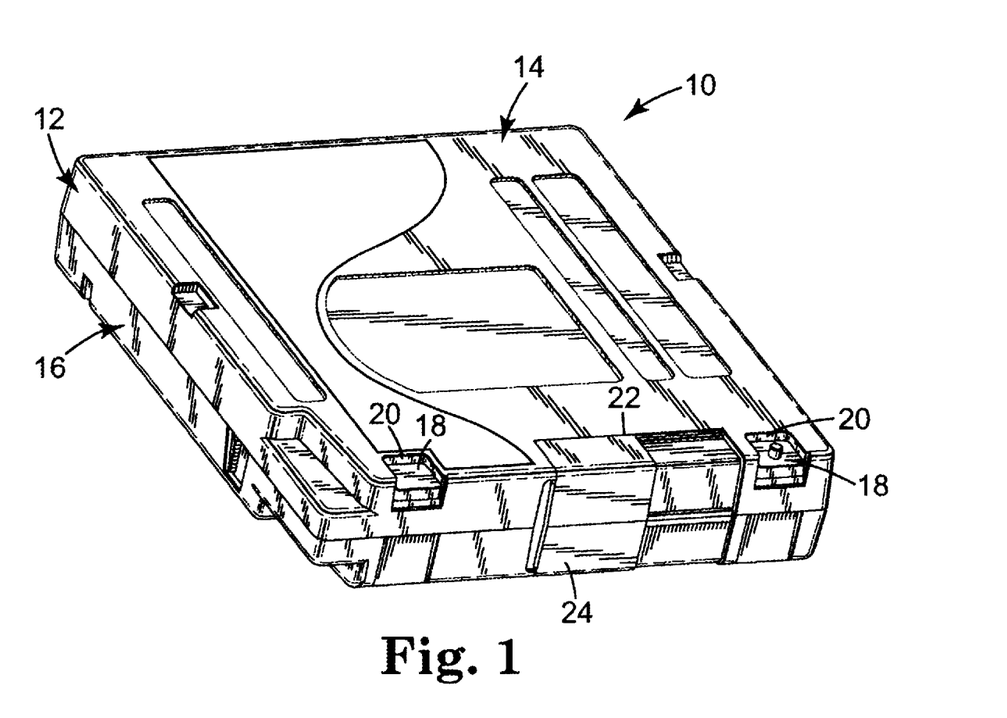
FIG. 1 is a perspective view of a data storage tape cartridge.

One preferred embodiment of a data storage tape cartridge 10 is shown in FIG. 1. Generally speaking, the data storage tape cartridge 10 includes a housing 12 defined by a first housing section 14 and a second housing section 16. The data storage tape cartridge 10 further includes a base plate 18, a portion of which is exposed through recesses 20 in the first housing section 14. Remaining components of the data storage tape cartridge 10 are described in greater detail below. However, with reference to FIG. 1, it should be understood that the first housing section 14 and the second housing section 16 are reciprocally mated to one another and form an enclosure within which the various other components, including the base plate 18, are maintained.

The housing 12 is preferably sized to be received by a typical tape drive (not shown). Thus, the housing 12 may be sized for use within a 5.25-inch (130 mm) form factor drive, a 3.5-inch (90 mm) form factor drive, or other useful sizes. Further, the first housing section 14 and the second housing section 16 combine to define a head access window 22 through which storage tape (not shown) otherwise maintained within the housing 12 can be accessed by a read/write head (not shown). To this end, the data storage tape cartridge 10 includes a door 24. The door 24 is preferably slidably secured to the housing 12 such that the door 24 can be selectively moved to provide access to the head access window 22.

In a preferred embodiment, the first housing section 14 is a cover, whereas the second housing section 16 is a base. With reference to the orientation shown in FIG. 1, the data storage tape cartridge 10 is normally inserted into a drive (not shown) with the cover 14 facing upward. It should be recognized, however, that the data storage tape cartridge 10 can be orientated to any position. Further, the design of the data storage tape cartridge 10 can be such that the first housing section 14 forms a base, whereas the second housing section 16 is a cover.

Figure 2:
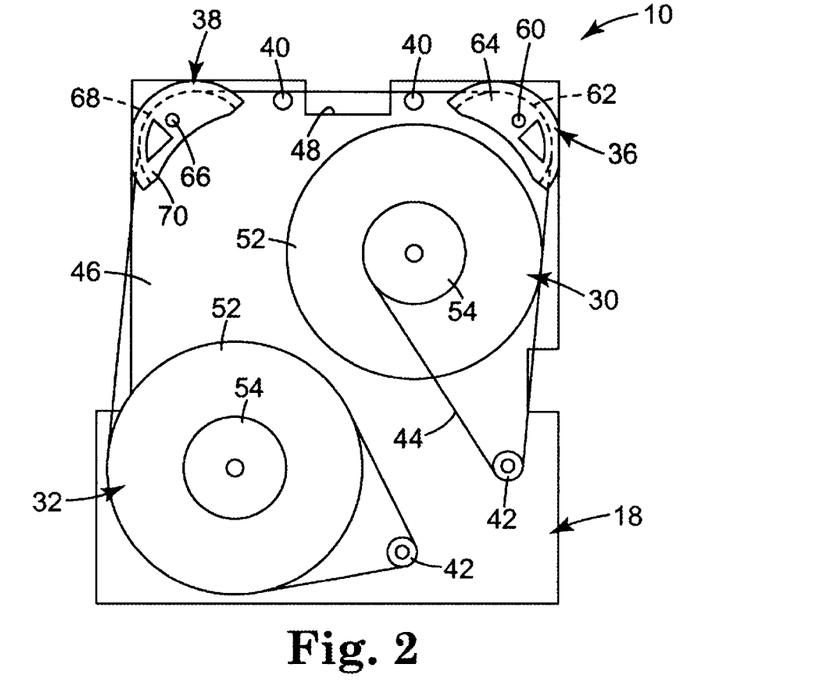
FIG. 2 is a top view of a data storage tape cartridge in accordance with the present invention with a portion of the housing removed.

The internal components of one preferred embodiment of the data storage tape cartridge 10 are shown in FIG. 2. Notably, for ease of illustration, FIG. 2 depicts the first housing section 14 in an inverted position, and the second housing section 16 (FIG. 1) removed. With this orientation in mind, the data storage tape cartridge 10 preferably includes the base plate 18, a first tape reel 30, a second tape reel 32, a first idler wrap guide 34, a first corner guide 36, a second corner guide 38, head pin guides (or head wrap pins) 40, a second idler wrap guide 42 and a storage tape 44. As described in greater detail below, the first tape reel 30 and the second tape reel 32 are rotatably secured about respective hub pins (not shown) extending from an interior surface 46 of the base plate 18. The remaining guides 34–42 are secured to the interior surface 46 of the base plate 18.

In a preferred embodiment, the base plate 18 made of a rigid material, such as aluminum. The base plate 18 is sized to nest within the first housing section 14 (FIG. 1), and defines a head access recess 48 corresponding with the head access window 22 (FIG. 1).

The tape reels 30, 32 are virtually identical and are positioned to rotate relative to the base plate 18 about respective hub pins (not shown). As is known in the art, each of the first and second tape reels 30, 32 includes opposing flanges 52 (one of which is shown in FIG. 2) and a central hub 54. The opposing flanges 52 are spaced along the hub 54 in accordance with a width of the storage tape 44. The storage tape 44 wraps around an outer circumference of the hub 54, laterally constrained by the opposing flanges 52.

The first corner guide 36 is secured to the base plate 18 by a pin 60 and includes an arcuate guide surface 62 (shown with dashed lines). In one preferred embodiment, the first corner guide 36 is a compliant tape guide such as that described in Erickson et al., U.S. Pat. No. 5,513,815, the teachings of which are incorporated herein by reference. With this configuration, the compliant tape guide includes a compliant member (not shown) biasing an edge of the storage tape 44 toward a transverse support plate 64. The arcuate guide surface 62 extends in a generally perpendicular fashion (or laterally) between the compliant member and the support plate 64. The storage tape 44 rides freely along the arcuate guide surface 62, while the support plate 64 prevents an upper edge of the storage tape 44 from disengaging the corner guide 36. The compliant member, in turn, is configured to maintain a position (or height) of the storage tape 44 relative to the support plate 64 (i.e., relative to the plane of FIG. 2, the compliant member biases an edge of the storage tape out of the plane of FIG. 2, whereas the support plate 64 limits, or provides an absolute stop to, this bias).

The second corner guide 38 is similarly secured to the base plate 18 by a pin 66. The second corner guide 38 is preferably a compliant tape guide and includes an arcuate guide surface 68, a compliant member (not shown) and a support plate 70.

As shown in FIG. 2, the first and second corner guides 36, 38 are positioned at opposite sides of the head access recess 48, and thus the head access window 22 (FIG. 1). With this configuration, the first and second corner guides 36, 38 serve to extend the storage tape 44 across the head access window 22. The head pin guides 40 are further provided to position the storage tape 44 across the head access window 22, as well as to define an appropriate head wrap angle when the storage tape 44 is engaged by a head (not shown) during use. With this in mind, the head pin guides 40 are preferably made of a relatively rigid material such as stainless steel.

The first and second idler wrap guides 34, 42 are described in greater detail below. In general terms, however, the idler wrap guides 34, 42 are virtually identical. The first idler wrap guide 34 is positioned to provide a tape path of the storage tape 44 from the first tape reel 30 to the first corner guide 36. The second idler wrap guide 42 is positioned to provide a tape path from the second corner guide 38 to the second tape reel 32.

Finally, the storage tape 44 is preferably a magnetic tape of a type commonly known in the art. For example, the storage tape 44 may consist of a balanced polyethylene naphthalate (PEN) based material coated on one side with a layer of magnetic material dispersed within a suitable binder system, and on the other side with a conductive material dispersed in a suitable binder system. Acceptable magnetic tape is available, for example, from Imation Corp. of St. Paul, Minn.

As shown in FIG. 2, the above components combine to define a tape path for the storage tape 44. In particular, the storage tape 44 extends from the first tape reel 30, and articulates about the first idler wrap guide 34, then extending to the first corner guide 36 and the second corner guide 38. Notably, the first corner guide 36 and the second corner guide 38 maintain a vertical planar positioning of the storage tape 44 at the head access recess 48 (and thus the head access window 22 (FIG. 1)), with the magnetic side of the storage tape 44 facing the window 22. The head pin guides 40 are positioned at opposite sides of the window 22 to define a head wrap angle when the storage tape 44 is engaged by a head (not shown) during use. From the second corner guide 38, the storage tape 44 articulates about an exterior portion of the second tape reel 32, and extends and wraps about the second idler wrap guide 42. The second idler wrap guide 42 directs the storage tape 44 to the second tape reel 32. The storage tape 44 is then wrapped about the second tape reel 32.

As described in greater detail below, the first and second idler wrap guides 34, 42 are configured and positioned to frictionally engage the storage tape 44. In this regard, the first and second idler wrap guides 34, 42 are positioned such that the storage tape 44 wraps about the respective idler wrap guides 34, 42 with a wrap angle of at least 30°; more preferably at least 45°; most preferably at least 60°. For example, as shown in FIG. 2, the first idler wrap guide 34 is positioned along the tape path, between the first tape reel assembly 30 and the first corner guide 36 such that the storage tape 44 is articulated through a wrap angle of approximately 100°. The second idler wrap guide 42 is positioned along the tape path between the second corner guide 38 and the second tape reel assembly 32 such that the storage tape 44 is articulated through a wrap angle of approximately 90°. With this preferred wrap angle relationship, sufficient storage tape-idler wrap pin engagement is ensured.

Figure 3A:
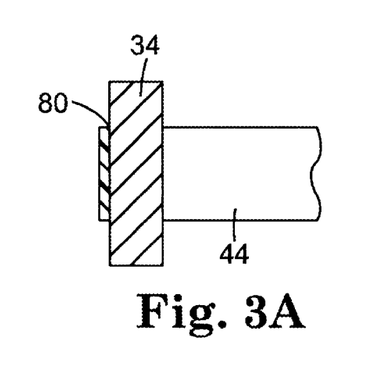
FIG. 3A is an enlarged, cross-sectional view of an idler wrap guide in accordance with the present invention; frictionally engaging a storage tape.

Each of the idler wrap guides 34, 42 are preferably identically formed. In one preferred embodiment, the idler wrap guides 34, 42 are cylindrical pins (or idler wrap pins) as best shown in FIG. 3A. As a point of reference, only one of the idler wrap guides 34 is depicted in FIG. 3A, it being understood that the second idler wrap guide 42 (FIG. 2) is identical. The idler wrap guide 34 is preferably a pin formed from a rigid material, such as stainless steel, aluminum, copper, brass, nickel, composites, etc. In one preferred embodiment, the idler wrap guides 34, 42 are pins formed from 304 stainless steel. Further, each of the idler wrap pins 34, 42 define an outer diameter selected to achieve certain performance characteristics as described below.

While the idler wrap guides 34, 42 have been described as being integral pins, other multi-component configuration are also acceptable. For example, the idler wrap pin 34 or 42 may include an outer sleeve rotatably disposed over a central shaft. With this configuration, the idler wrap pin 34 or 42 serves as a roller.

The preferred cylindrical, 304 stainless steel configuration ensures frictional engagement between the storage tape 44 and the idler wrap pin 34, 42 at predetermined tape speeds. In particular, and with reference to FIGS. 2 and 3A, during use, one or both of the first tape reels 30, 32 are driven by a tape drive (not shown) at different operational speeds. Generally speaking, these operational speeds are divided into three categories, including a start-up acceleration mode, a data transfer mode, and a search mode. While tape speeds within each operational mode may vary from drive to drive (and from data storage tape cartridge to data storage tape cartridge), generally tape speeds in the start-up acceleration mode (in which the tape speed is being accelerated) are in the range of approximately 0–1 meters per second; in the range of 1–4.5 meters per second for the data transfer mode; and greater than approximately 5 meters per second in the search mode.

Regardless of exact tape speed, a tape alignment concern arises due to the fact that each of the tape reels 30, 32 are configured such that a slight spacing exists between edges of the storage tape 44 and the opposing flanges 52. Typically, the spacing is on the order of 0.002–0.01 inch (0.05–0.25 mm) depending upon winding location. As the tape reels 30, 32 are rotated, then, it is possible for the storage tape 44 to move laterally between the opposing flanges 52 (i.e., into or out of the plane of FIG. 2). This is especially true in the data transfer mode in which, due to back and forth rotation of the tape reels 30, 32, there will be several layers of storage tape on the respective hub 54 that are not tightly engaged with the next, inner layer, meaning that there are possibly 20–40 inches (510–1020 mm) of the storage tape 44 on each individual tape reel 30, 32 that is essentially suspended on air, and limited in edge-to-edge (or lateral) movement only by the opposing flanges 52. Due to this layer-to-layer spacing, a minute amount of energy in the lateral direction can cause the storage tape 44 to move laterally. Notably, the first and second corner guides 36, 38 cannot "correct" this lateral movement issue. That is to say, at tape speeds in the data transfer mode, an air barrier is formed between the storage tape 44 and the respective arcuate guide surfaces 62, 68 provided by the respective corner guide 36, 38. Effectively, the storage tape 44 "rides" along this air barrier, and is free to move laterally. Although the support plate 64, 70 and/or the compliant member (not shown) provide absolute stops to this lateral movement, the end result is the storage tape 44 deflecting or "pivoting" laterally at the particular corner guide 36, 38, such that the storage tape 44 is laterally skewed through the head access window 22 (FIG. 1).

Incorporation of the idler wrap guides 34, 42 overcomes the above-described lateral movement problem. More particularly, and as shown in FIG. 3A, the idler wrap guide 34 is designed such that a backside 80 of the storage tape 44 is frictionally engaged by the pin surface at tape speeds in the data transfer mode. Due to this frictional engagement, the idler wrap guide 34 dictates that the storage tape 44 must give up energy before it can move in a lateral direction. Thus, the idler wrap guide 34 (and the idler wrap guide 42 in FIG. 2) frictionally dampens lateral movement of the storage tape 44. In other words, the idler wrap guides 34, 42 present a tape drag surface to the storage tape 44.

Figure 3B:
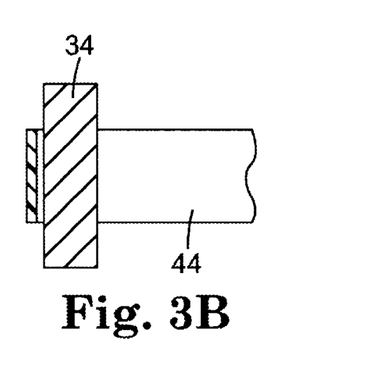
FIG. 3B is an enlarged, cross-sectional view of the idler wrap guide of FIG. 3A, with an air barrier formed adjacent the storage tape.

An outer diameter of the idler wrap pin 34, 42 is selected (in conjunction with the particular material) to ensure frictional engagement with the storage tape 44 at tape speeds in the data transfer mode. Thus, in one preferred embodiment, each of the idler wrap pins 34, 42 has a diameter in the range of 0.15–0.75 inch (3.8–19 mm), most preferably 0.25 inch (6.35 mm). It is recognized that while the idler wrap guides 34, 42 effectively dampens lateral movement of the storage tape 44, increased power may be required to rotate the tape reels 30, 32 to achieve desired tape speeds due to the increased friction presented by the idler wrap guides 34, 42. Further, it is recognized that some lateral movement of the storage tape 44 can be tolerated in the search mode in that precise head-to-data track alignment is not required. Therefore, it is additionally preferred that the idler wrap guides 34, 42 be configured such that only limited, if any, frictional engagement between the idler wrap guides 34, 42 and the storage tape 44 at the increased storage tape speeds associated with the search mode be provided. Thus, in one preferred embodiment, each of the idler wrap pins 34, 42 has a diameter of 0.25 inch (6.35 mm) to ensure frictional contact between the idler wrap guides 34, 42 and the storage tape 44 at storage tape speeds in the data transfer mode, but allows the storage tape 44 to "lift off" at higher speeds. This relationship is shown in FIG. 3B in which a storage tape 44 traveling at a speed of 6 meters per second is no longer frictionally engaged with the idler wrap guide 34 but instead "rides" along an air barrier formed between the storage tape 44 and the idler wrap pin 34.

Figure 3C:
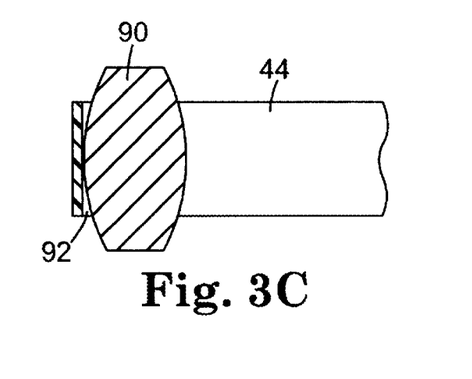
FIG. 3C is an enlarged, cross-sectional view of an alternative idler wrap guide and storage tape.

While the idler wrap guide 34, 42 has been preferably described as being a cylindrical pin, other integral shapes can also be useful. For example, FIG. 3C depicts an alternative embodiment of an idler wrap guide 90 associated with the storage tape 44. The idler wrap guide 90 is a bowed pin, defining a positive central crown. With this configuration, a more even pressure profile may be provided, whereby the storage tape 44 rides along a more symmetric air zone 92.

Figure 3D:
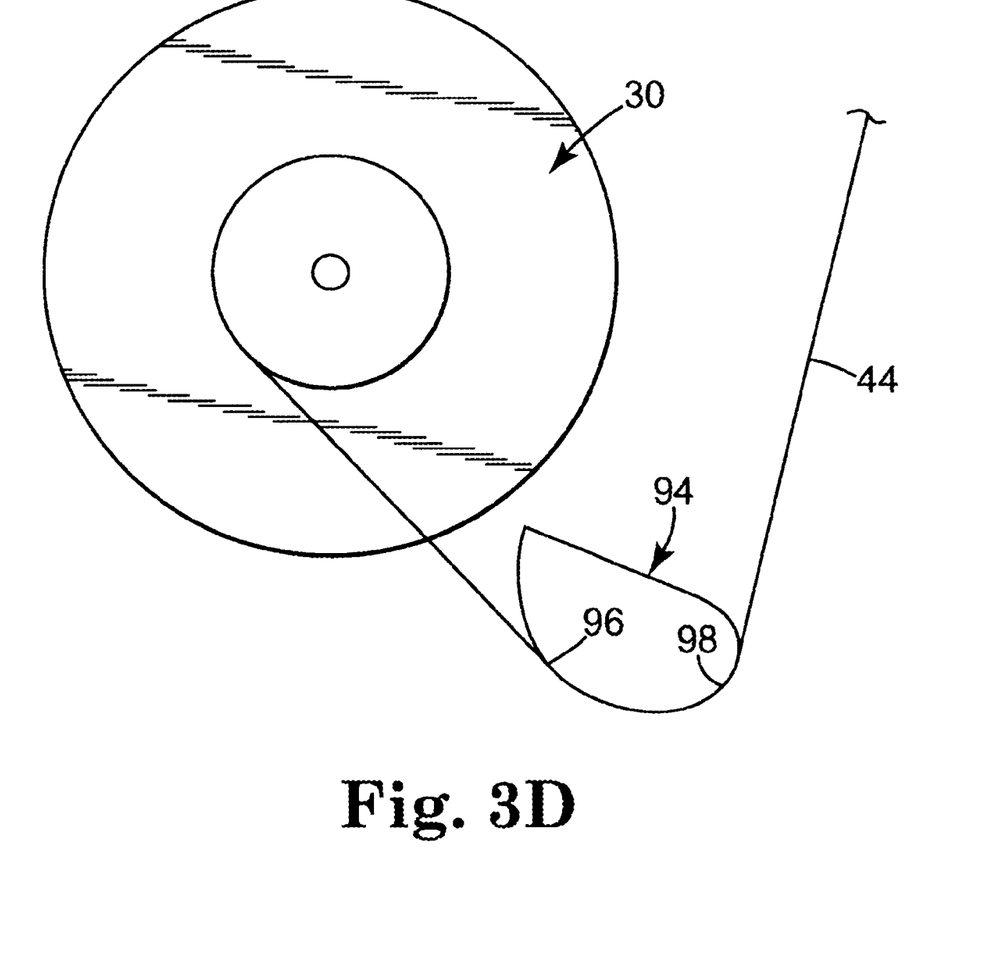
FIG. 3D is an enlarged, top view of an alternative idler wrap guide shown in conjunction with a storage tape and tape reel.

Yet another alternative embodiment of an idler wrap guide 94 is shown in FIG. 3D. As a point of reference, the idler wrap guide 94 is shown in conjunction with the tape reel 30 and a portion of the storage tape 44. As with the previous embodiments, the idler wrap guide 94 is preferably disposed within the housing 12 (FIG. 1). In the embodiment of FIG. 3D, the idler wrap guide 94 is a pin defining an entrance curvature 96 and a lateral drag curvature 98. The entrance curvature 96 and the lateral drag curvature 98 preferably provide differently sized (or curved) storage tape engagement/guide surfaces. More particularly, the entrance curvature 96 preferably defines a diameter greater than a diameter of the lateral drag curvature 98 such that the idler wrap guide 94 has a compound radius (or diameter) of curvature. In this regard, the entrance curvature 96 preferably has a diameter in the range of 0.5–1.5 inch (12.5–38 mm) and the lateral drag curvature 98 has a diameter in the range of 0.1–0.5 inch (2.5–12.5 mm). In a most preferred embodiment, the entrance curvature 96 has a diameter of approximately 1 inch (25.4 mm) and the lateral drag curvature 98 has a diameter of 0.25 inch (6.35 mm), although other diameters are equally acceptable.

The idler wrap guide 94 is preferably integrally formed from a rigid material such as stainless steel, copper, brass, nickel, composites, etc. In one preferred embodiment, the idler wrap guide 94 is 304 stainless steel.

The idler wrap guide 94 is positioned within the housing 12 (FIG. 1) such that the storage tape 44 extends from the tape reel 30 to the entrance curvature 96. The storage tape 44 articulates about the entrance curvature 96 and then the lateral drag curvature 98. From the lateral drag curvature 98, the storage tape 44 extends to other areas within the housing 12 (FIG. 1), such as the first corner guide 36 (FIG. 2).

Advantages of the idler wrap guide 94 are exemplified with reference to operation of the tape reel 30 during "spooling on" (clockwise rotation relative to FIG. 3D) and "spooling off" (counterclockwise rotation relative to FIG. 3D) operations. As with previously described embodiments, during "spooling on" rotation of the tape reel 30, the idler wrap guide 94 presents a small radius of curvature (i.e., the lateral drag curvature 98) to the storage tape 44 at relatively low tape speeds (e.g., start-up acceleration mode and data transfer mode), preventing the formation of a hydrodynamic air bearing, thereby allowing the storage tape 44 to frictionally engage the idler wrap guide 94. This engagement frictionally dampens lateral movement of the storage tape 44

(i.e., into or out of the page of FIG. 3D). As a point of reference, the lateral drag curvature 98 corresponds with the tape drag surface presented by the idler wrap guides 34, 42 (FIG. 2) previously described. At relatively high tape speeds (e.g., search mode), the lateral drag curvature 98 will allow the formation of hydrodynamic air bearing, thereby allowing the storage tape 44 to lift off or "fly" along the idler wrap guide 94. However, during "spooling off" rotation of the tape reel 30, the idler wrap guide 94 presents a large radius of curvature (i.e., the entrance curvature 96) to the storage tape 44 allowing the formation of a hydrodynamic air bearing at both low and high tape speeds, thereby preventing the storage tape 44 from frictionally engaging the idler wrap guide 94. The lower friction minimizes tape drive (not shown) power requirements encountered with other embodiments of the idler wrap guide.

As with previous embodiments, one or more of the idler wrap guide 94 can be incorporated within the data storage tape cartridge 10 (FIG. 1). Further, the idler wrap guide 94 can be assembled so as to selectively pivot about a vertical axis (extending out of the page of FIG. 3D). With this configuration, an adjustment device (not shown), such as a stepper motor, can be coupled to the idler wrap guide 94 to dictate a desired orientation of the idler wrap guide 94 relative to the tape reel 30 and thus to the storage tape 44. Where desired, the adjustment device will "rotate" the idler wrap guide 94 to a preferred position effectuating increased or decreased interaction between the storage tape 44 and the lateral drag curvature 98. By increasing or decreasing storage tape 44/lateral drag curvature 98 interaction, frictional drag forces imparted on to the storage tape 44 are likewise altered. Thus, for example, orientation of the idler wrap guide 94 can be altered to compensate for variable tape speeds.

Figure 4:
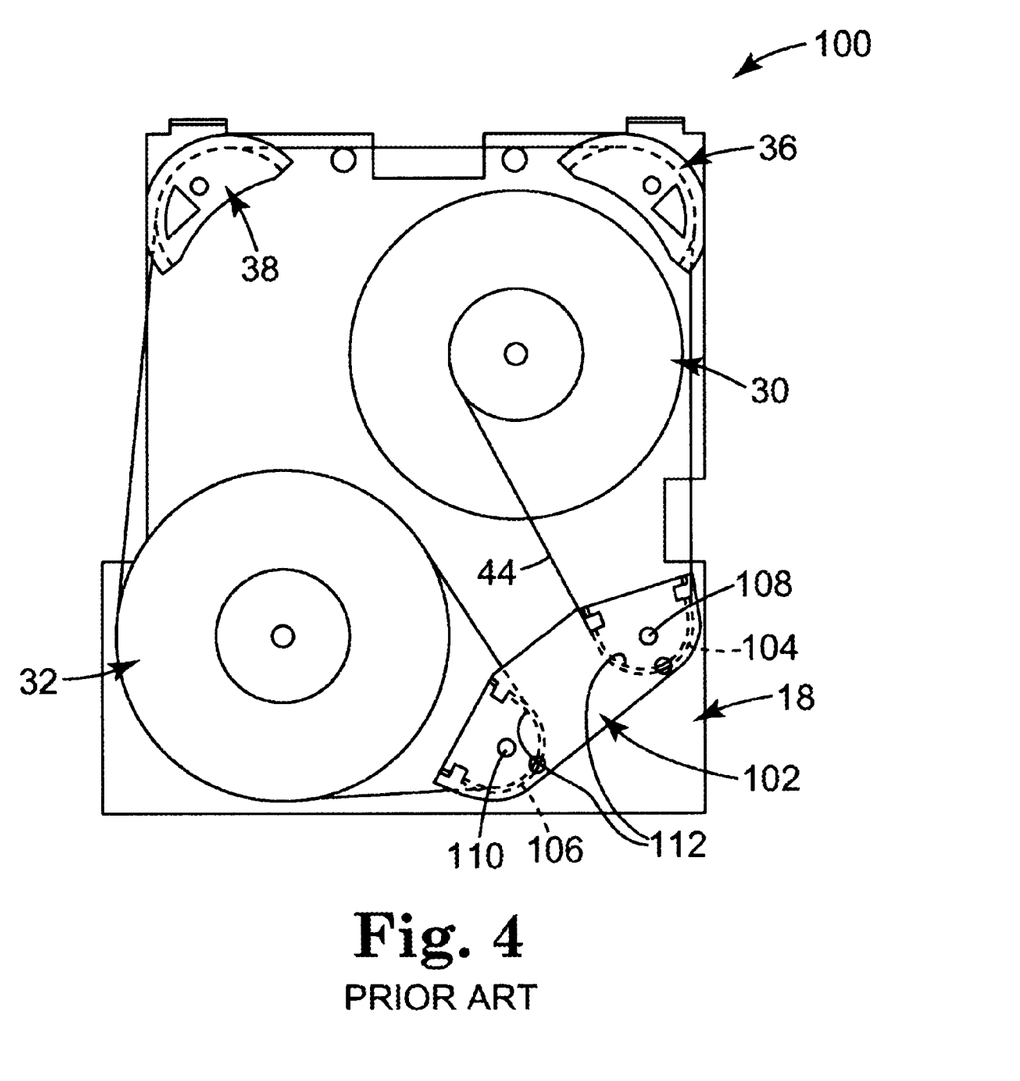
FIG. 4 is a top view of a prior art data storage tape cartridge with a portion of the housing removed.

The idler wrap guides 34, 42, 90 or 94 can be located along the tape path at locations other than those depicted in FIG. 2. That is to say, the first idler wrap guide 34 can be positioned more closely to, or further from, the first tape reel 30; and the second idler guide 42 can be positioned more closely to, or spaced further from, the second tape reel 32. In one preferred embodiment, however, the idler wrap guides 34, 42 are positioned at locations previously formed in the base plate 18. For example, FIG. 4 depicts a top view of a prior art data storage tape cartridge 100 currently available from Imation Corp. of St. Paul, Minn. As is revealed by comparison of FIG. 4 with FIG. 2, the data storage tape cartridge 100 is highly similar to the data storage tape cartridge 10 except that it includes a third guide piece 102 defining a third arcuate surface (or corner guide) 104 and fourth arcuate surface 106 (or corner guide). As shown in FIG. 4, the third arcuate guide surface 104 directs the storage tape 44 from the first tape reel 30 to the first corner guide 36. Conversely, the fourth arcuate guide surface 106 directs the storage tape 44 from the second corner guide 38 to the second tape reel 32. The third guide piece 102 is assembled to the base plate 18 by pins 108, 110. Thus, the base plate 18 associated with the data storage tape cartridge 100 is preformed with openings sized to receive the pins 108, 110. By incorporating a selected material for the pins 108, 110, the third compliant guide 102 can be eliminated and the pins 108, 110 can serve as the idler wrap guides 34, 42, respectively, shown in FIG. 2. Alternatively, a sleeve having a desired outer diameter can be placed over and secured to each of the pins 108, 110. As a point of reference, the sleeves have been shown with dashed lines at 112. The sleeves 112 may be permanently attached to the respective pin 108, 110 or may be rotatable such that the resulting assembly serves as a roller for the storage tape 44. Notably, location of the pins 108, 110 provide for a sufficient wrap angle upon engagement with the storage tape 44. Once again, and as previously described, the outer diameter of the sleeves 112 is preferably in the range of 0.25–0.75 inch (3.8–19 mm), sufficient to frictionally engage the storage tape 44 at storage tape speeds in the data transfer mode, and preferably allow for the storage tape 44 to "ride" along an air barrier at increased storage tape speeds in the search mode. Thus, existing data storage tape cartridges can be modified or retrofitted in accordance with the present invention.

Figure 5:
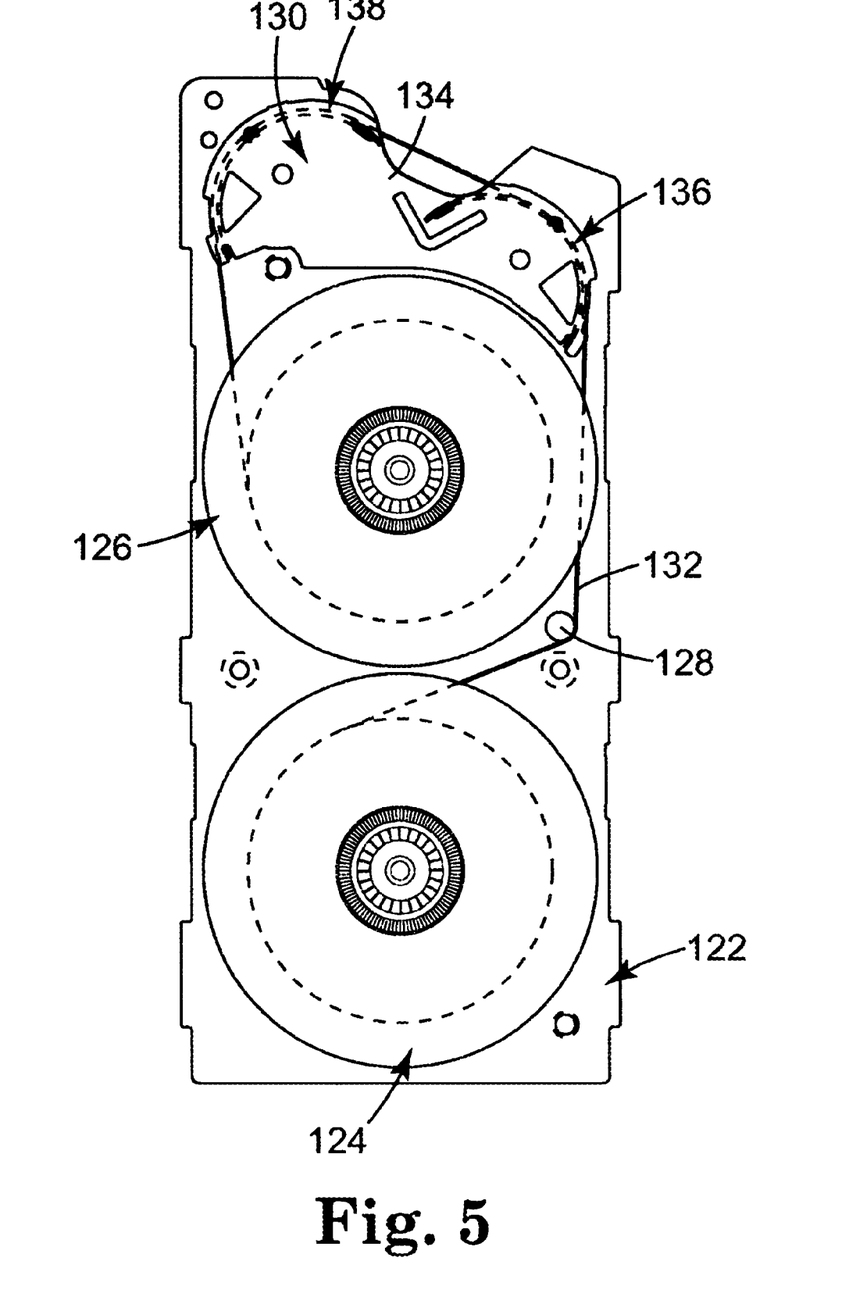
FIG. 5 is a perspective view of an alternative data storage tape cartridge in accordance with the present invention with a portion of a housing removed.

The data storage tape cartridge 10 has been preferably described as incorporating two of the idler wrap pins 34, 42. Alternatively, only one of the idler pins 34, 42 need be provided. For example, the data storage tape cartridge 10 can be configured to include the first idler wrap pin 34, whereas the second idler wrap pin 42 is replaced by a compliant guide surface. Other designs are equally acceptable. For example, FIG. 5 depicts a portion of an alternative embodiment data storage tape cartridge 120. The data storage tape cartridge 120 includes a housing (not shown), a base plate 122, a first tape reel 124, second tape reel 126, an idler wrap guide 128, a compliant guide 130 and a storage tape 132. Similar to previous designs, the base plate 122 defines a head access recess or window 134. The compliant guide 130 forms corner guides or guide surfaces 136 and 138 at opposite sides of the head access window 134. The data storage tape cartridge 120 is configured to define a tape path whereby the storage tape 132 extends from the first tape reel 124, about the idler wrap guide 128, and to the compliant guide 130. In particular, the compliant guide directs the storage tape 132 from the first corner guide 136, across the head access window 134, and to the second corner guide 138. From the second corner guide 138, the storage tape 132 is directed to and is wrapped about the second tape reel 126. By positioning the idler wrap guide 128 to engage the storage tape 132 at a wrap angle of at least 30°, and by forming the idler wrap guide 128 from an acceptable material and outer diameter, the idler wrap guide 128 will frictionally engage the storage tape 132 at storage tape speeds associated with the data transfer mode. Due to this frictional engagement, the idler wrap guide 128 dampens lateral movement of the storage tape 132, thereby effectuating proper lateral orientation of the storage tape 132 at the head access window 134. Once again, other locations of the idler wrap guide 128 will provide similar results.

The tape path provided by the present invention has been described with reference to dual reel tape cartridges (10 and 120). However, the same tape path can be achieved with a single reel tape cartridge by locating an idler wrap guide (such as the idler wrap pin previously described) within the tape drive. Upon engagement of the tape cartridge by the tape drive, the storage tape is articulate through a tape path that directs the storage tape across the read/write head. This tape path is defined in part by one or more idler wrap guides (for example, the idler wrap guides or pins 34, 42 of FIG. 2 or the idler wrap guide or pin 132 of FIG. 5). The resulting tape path will be similar, at least in part, to the tape paths shown in FIGS. 2 and 5 where by the idler wrap guide directs the storage tape through a wrap angle of at least 30° and is configured to frictionally dampen lateral movement of the storage tape during use, especially at tape speeds in the data transfer mode.

The data storage tape cartridge and tape path of the present invention provides a marked improvement over previous designs. More particularly, by incorporating one or more idler wrap guides, the data storage tape cartridge or tape path of the present invention overcomes lateral tape movement issues encountered with current data storage tape cartridge or tape path designs. In particular, at storage tape speeds associated with data transfer mode of operation, the idler wrap guide frictionally dampens a lateral bias imparted onto the storage tape by the tape reel(s). Further, in one preferred embodiment, the idler wrap guide is configured such that at increased speeds associated with search mode operation, the storage tape is not frictionally engaged by the idler wrap guide, such that overall tape drive power requirements are minimized.

Although the present invention has been described with reference to preferred embodiments, workers skilled in the art will recognize that changes may be made in form and detail without departing from the spirit and scope of the present invention. For example, three or more idler wrap guides may be utilized. Further, location of the idler wrap guide(s) associated with a particular data storage tape cartridge can be varied greatly from the position shown in the various Figures.

What is claimed is:

1. A data storage tape cartridge comprising:
   a housing defining a head access window;
   first and second tape reels rotatably disposed within the housing;
   a storage tape extending between the first and second tape reels;
   first and second comer guides disposed within the housing at opposite sides of the head access window, respectively, for guiding the storage tape across the head access window; and
   a first idler wrap guide disposed within the housing having an entrance curvature and a lateral drag curvature, the entrance curvature having a diameter greater than a diameter of the lateral drag curvature, the first idler wrap guide defining a tape path of the storage tape extending from the first tape reel to the entrance curvature from the entrance curvature to the lateral drag curvature and from the lateral drag curvature to the first comer guide;
   wherein the first idler wrap guide is configured to frictionally dampen lateral movement of the storage tape upon rotation of the tape reels.

2. The data storage tape cartridge of claim 1, further comprising:
   a second idler wrap guide disposed within the housing having an entrance curvature and a lateral drag curvature, the entrance curvature having a diameter greater than a diameter of the lateral drag curvature, wherein the second idler wrap guide firer defines the tape path to extend from the second comer guide to the lateral drag curvature, from the lateral drag curvature to the entrance curvature, and from the entrance curvature to the second tape reel, the second idler wrap guide being configured to frictionally dampen lateral movement of the storage tape upon rotation of the tape reels.

3. The data storage tape cartridge of claim 1, wherein the first idler wrap guide is a cylindrical pin having a diameter in the range of 3.8–19 mm.

4. The data storage tape cartridge of claim 3, wherein the pin has a diameter of approximately 6.35 mm.

5. The data storage tape cartridge of claim 1, wherein the first idler wrap guide is a pin, at least a portion of the pin being bowed.

6. The data storage tape cartridge of claim 1, wherein the first idler wrap guide is a roller.

7. The data storage tape cartridge of claim 1, wherein the first idler wrap guide provides a tape drag surface configured to frictionally engage the storage tape at storage tape speeds of at least approximately 1.5 meters per second.

8. The data storage tape cartridge of claim 7, wherein the tape drag surface is configured to not frictionally engage the storage tape at storage tape speeds of at least approximately 5 meters per second.

9. The data storage tape cartridge of claim 1, wherein the first roller wrap guide is a pin.

10. The data storage tape cartridge of claim 9, wherein the pin is configured such that at high tape speeds, the storage tape frictionally engages substantially only the entrance curvature.

11. The data storage tape cartridge of claim 1, wherein the entrance curvature has a diameter in the range of 12.5–38 mm and the lateral drag curvature has a diameter in the range of 2.5–12.5 mm.

12. The data storage tape cartridge of claim 11, wherein the entrance curvature has a diameter of approximately 25.4 mm and the lateral drag curvature has a diameter of approximately 6.35 mm.

13. A data storage tape cartridge comprising:
    a housing defining a head access window;
    first and second tape reels rotatably disposed within the housing;
    a storage tape extending between the first and second tape reels along a tape path;
    first and second comer guides disposed within the housing for directing the tape path across the head access window; and
    a first idler wrap guide disposed within the housing along the tape path between the first tape reel and the first comer guide, the first idler wrap guide having an entrance curvature and a lateral drag curvature, the entrance curvature having a diameter greater than a diameter of the lateral drag curvature and being positioned to direct the storage tape through a wrap angle of at least 30°, whereby the first idler wrap guide frictionally dampens lateral movement of the storage tape upon rotation of the tape reels.

14. The data storage tape cartridge of claim 13, further comprising:
    a second idler wrap guide disposed within the housing along the tape path between the second comer guide and the second tape reel, the second idler wrap guide having an entrance curvature and a lateral drag curvature, the entrance curvature having a diameter greater than a diameter of the lateral drag curvature and being positioned to direct the storage tape through a wrap angle of at least 30°, whereby the second idler wrap guide frictionally dampens lateral movement of the storage tape upon rotation of the tape reels.

15. The data storage tape cartridge of claim 13, wherein the first idler wrap guide is a cylindrical pin having a diameter in the range of 3.8–19 mm.

16. The data storage tape cartridge of claim 15, wherein the pin has a diameter of approximately 6.35 mm.

17. The data storage tape cartridge of claim 13, wherein the first idler wrap guide is a pin, at least a portion of the pin being bowed.

18. The data storage tape cartridge of claim 13, wherein the first idler wrap guide is a roller.

19. The data storage tape cartridge of claim 13, wherein the first idler wrap guide provides a lateral drag surface configured to frictionally engage the storage tape at storage tape speeds of at least approximately 1.5 meters per second.

20. The data storage tape cartridge of claim 19, wherein the tape drag surface is configured to not frictionally engage the storage tape at storage tape speeds of at least approximately 5 meters per second.

21. The data storage tape cartridge of claim 13, wherein the first idler wrap guide is a pin.

22. The data storage tape cartridge of claim 21, wherein the pin is oriented such that the storage tape extends from the first tape reel to the entrance curvature.

23. The data storage tape cartridge of claim 13, wherein the entrance curvature has a diameter in the range of 12.5–38 mm and the lateral drag curvature has a diameter in the range of 2.5–12.5 mm.

24. The data storage tape cartridge of claim 23, wherein the entrance curvature has a diameter of approximately 25.4 mm and the lateral drag curvature has a diameter of approximately 6.35 mm.

25. A method of using a data storage tape cartridge and tape drive, the method including:

engaging the data storage tape cartridge within the tape drive, wherein the data storage tape cartridge includes a housing, at least one tape reel rotatably disposed within the housing and a storage tape wound about and extending from the at least one tape reel, and further wherein the tape drive includes a read/write head;

articulating the storage tape through a tape path such that the storage tape engages the read/write head, the tape path being defined in part by an idler wrap guide having an entrance curvature and a lateral drag curvature, the entrance curvature having a diameter greater than a diameter of the lateral drag curvature and; and driving the storage tape along the read/write head, wherein the storage tape is driven at different tape speeds for a start-up acceleration mode, a data transfer mode and a search mode;

wherein the idler wrap guide frictionally dampens lateral movement of the storage tape during at least the data transfer mode.

26. The method of claim 25, wherein the data storage tape cartridge includes a single tape reel.

27. The method of claim 25, wherein the data storage tape cartridge includes at least two tape reels.

28. The method of claim 27, wherein the idler wrap guide is disposed within the housing of the data storage tape cartridge.

29. The method of claim 25, wherein the tape speed of the data transfer mode is in the range of 1–4.5 meters per second.

30. The method of claim 26, wherein the idler wrap guide includes a tape drag surface for frictionally engaging the storage tape during the data transfer mode, and further wherein a lateral drag surface does not frictionally engage the storage tape during the search mode.

31. The method of claim 30, wherein the tape speed of the search mode is greater than approximately 5 meters per second.

32. A tape path for a storage tape of a data storage tape cartridge engaged by a tape drive including a read/write head, wherein the storage tape is driven transversely along the read/write head during use, the tape path being defined in part by an idler wrap guide having an entrance curvature and a lateral drag curvature, the entrance curvature having a diameter greater than a diameter of the lateral drag curvature and configured to frictionally dampen lateral movement of the storage tape during use.

33. The tape path of claim 32, wherein the idler wrap guide is located within the tape drive.

34. The tape path of claim 32, wherein the idler wrap guide is located within the data storage tape cartridge.

35. The tape path of claim 32, wherein the idler wrap guide directs the storage tape through a wrap angle of at least 30°.

36. The tape path of claim 32, wherein the idler wrap guide is a pin.

37. The tape path of claim 32, wherein the idler wrap guide is a roller.

* * * * *

UNITED STATES PATENT AND TRADEMARK OFFICE
CERTIFICATE OF CORRECTION

PATENT NO. : 6,405,957 B1
DATED : June 18, 2002
INVENTOR(S) : Jerry L. Alexander et al.

It is certified that error appears in the above-identified patent and that said Letters Patent is hereby corrected as shown below:

Column 11,
Lines 29 and 52, "comer" should read -- corner --.
Line 51, "firer" should read -- further --.

Column 12,
Lines 29, 34 and 45, "comer" should read -- corner --.

Signed and Sealed this

Third Day of May, 2005

JON W. DUDAS
*Director of the United States Patent and Trademark Office*